United States Patent
Johnson et al.

(10) Patent No.: US 11,428,418 B2
(45) Date of Patent: Aug. 30, 2022

(54) OVEN APPLIANCE HAVING A HIGH-HEAT COOKING SURFACE

(71) Applicant: Haier US Appliance Solutions, Inc., Wilmington, DE (US)

(72) Inventors: Eric Scott Johnson, Louisville, KY (US); Hans Juergen Paller, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 177 days.

(21) Appl. No.: 16/747,691

(22) Filed: Jan. 21, 2020

(65) Prior Publication Data

US 2021/0222889 A1 Jul. 22, 2021

(51) Int. Cl.

| F24C 15/16 | (2006.01) |
| F24C 7/08 | (2006.01) |
| H05B 3/68 | (2006.01) |
| H05B 1/02 | (2006.01) |
| A21B 1/40 | (2006.01) |
| F24C 3/04 | (2021.01) |
| F24C 3/12 | (2006.01) |
| A21B 1/28 | (2006.01) |

(52) U.S. Cl.
CPC ............. F24C 15/166 (2013.01); A21B 1/28 (2013.01); A21B 1/40 (2013.01); F24C 3/04 (2013.01); F24C 3/128 (2013.01); F24C 7/085 (2013.01); H05B 1/0263 (2013.01); H05B 3/68 (2013.01); H05B 2213/07 (2013.01)

(58) Field of Classification Search
CPC .......... F24C 15/166; F24C 7/085; H05B 3/68; H05B 1/0263

USPC ................................ 219/209, 392, 400, 757
See application file for complete search history.

(56) References Cited

U.S. PATENT DOCUMENTS

| 6,104,005 A * | 8/2000 | Adamski .................. F24C 7/06 |
| | | 219/409 |
| 6,831,255 B1 * | 12/2004 | Levi ......................... F24C 7/06 |
| | | 126/21 A |
| 10,012,392 B2 | 7/2018 | Froelicher et al. |
| 2002/0074323 A1 * | 6/2002 | De'Longhi .......... F24C 15/325 |
| | | 219/400 |
| 2004/0149722 A1 | 8/2004 | Schnell et al. |
| | (Continued) |

FOREIGN PATENT DOCUMENTS

| CN | 204795645 U | 11/2015 |
| EP | 2251609 B1 | 8/2017 |

*Primary Examiner* — Thien S Tran
(74) *Attorney, Agent, or Firm* — Dority & Manning, P.A.

(57) ABSTRACT

An oven appliance, as provided herein, may include a plurality of chamber walls, a bottom heating element, a base panel, and a cooking plate. The plurality of chamber walls may define an oven chamber. The plurality of chamber walls may include a back wall, a top wall, a first side wall, a second side wall, and a bottom wall. The bottom heating element may be mounted above the bottom wall to heat a cooking surface within the oven chamber. The base panel may be disposed over the bottom heating element. The base panel may define an oven vent and a receiving zone spaced apart from the oven vent. The base panel may further define an enclosed region with the bottom wall about the bottom heating element. The cooking plate may be disposed on the base panel within the receiving zone. The cooking plate may define the cooking surface.

20 Claims, 6 Drawing Sheets

(56) References Cited

U.S. PATENT DOCUMENTS

| | | |
|---|---|---|
| 2017/0089590 A1 | 3/2017 | Bruin-Slot et al. |
| 2018/0003390 A1* | 1/2018 | Trice .................. F24C 15/04 |
| 2018/0020680 A1* | 1/2018 | Froelicher .......... F24C 15/2007 |
| | | 126/21 A |

* cited by examiner

OVEN APPLIANCE HAVING A HIGH-HEAT COOKING SURFACE

FIELD OF THE INVENTION

The present subject matter relates generally to oven appliances, and more particularly, to heating assemblies of an oven appliance.

BACKGROUND OF THE INVENTION

Conventional residential and commercial oven appliances generally include a cabinet that includes a cooking chamber for receipt of food items for cooking. Multiple gas or electric heating elements are positioned within the cabinet for heating the cooking chamber to cook food items located therein. The heating elements can include, for example, a bake heating assembly positioned at a bottom of the cooking chamber and a separate broiler heating assembly positioned at a top of the cooking chamber.

Typically, food or utensils for cooking are placed on wire racks within the cooking chamber and above the bake heating assembly. In some instances, protective or radiant plates are positioned over the bake heating assembly to protect the bake heating assembly or assist in evenly distributing heat across the bottom of the cooking chamber. Oftentimes, the wire racks are at least mounted well above a bake heating assembly to ensure the bake heating assembly is not damaged or a user does not accidentally contact the bake heating assembly. When the bake heating assembly is activated, heat from the bake heating assembly is thus forced to rise through an air gap, and any other intermediate elements, between the bake heating assembly and the wire rack before the utensil on the wire rack can be heated. Heat is within the cooking chamber is relatively diffuse, and the temperature is generally consistent about the item or items on the rack.

Although these conventional configurations are useful for many types of foods, there are certain disadvantages. For instance, certain food items benefit from very high, localized (i.e., non-diffuse) heat. Oftentimes, stone or specialized high-heat pans are used for trapping heat against the bottom of flat-breads or pizza. Such pans may be difficult to preheat or maintain a specific temperature desired by the user. Although placing a pan closer to a heating element may help heat the pan faster or to a higher temperature, this may cause the pan or trapped heat to damage portions of the oven appliance. Moreover, trapping or localizing heat too much may lead to burning certain portions of a food item, without sufficiently cooking the rest.

Accordingly, it would be advantageous to provide an oven appliance capable of safely generating high heat on a specific cooking surface within the oven appliance without unduly trapping heat or causing damage to the oven appliance or cooking surface.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an oven appliance is provided. The oven appliance may include a plurality of chamber walls, a bottom heating element, an insulator plate, a base panel, and a cooking plate. The plurality of chamber walls may define an oven chamber. The plurality of chamber walls may include a back wall, a top wall, a first side wall, a second side wall, and a bottom wall. The bottom heating element may be mounted above the bottom wall to heat a cooking surface within the oven chamber. The insulator plate may be disposed between the bottom heating element and the bottom wall along a vertical direction. The base panel may be disposed over the bottom heating element. The base panel may define an oven vent and a receiving zone spaced apart from the oven vent. The base panel may further define an enclosed region with the bottom wall about the bottom heating element. The cooking plate may be disposed on the base panel within the receiving zone. The cooking plate may define the cooking surface.

In another exemplary aspect of the present disclosure, an oven appliance is provided. The oven appliance may include a plurality of chamber walls, a bottom heating element, an insulator plate, a base panel, and a cooking plate. The plurality of chamber walls may define an oven chamber. The plurality of chamber walls may include a back wall, a top wall, a first side wall, a second side wall, and a bottom wall. The bottom wall may define a cavity vent upstream from the oven chamber. The bottom heating element may be mounted above the bottom wall to heat a cooking surface within the oven chamber. The insulator plate may be disposed between the bottom heating element and the cavity vent along a vertical direction. The base panel may be disposed within the oven chamber and define an enclosed region with the bottom wall downstream from the cavity vent. The base panel may define an oven vent and a receiving zone. The receiving zone may be positioned above the bottom heating element. The oven vent may be directed away from the receiving zone to route air out of the enclosed region. The cooking plate may be disposed on the base panel within the receiving zone. The cooking plate may define the cooking surface.

In yet another exemplary aspect of the present disclosure, an oven appliance is provided. The oven appliance may include a plurality of chamber walls, a bottom heating element, a base panel, and a cooking plate. The plurality of chamber walls may define an oven chamber. The plurality of chamber walls may include a back wall, a top wall, a first side wall, a second side wall, and a bottom wall. The bottom wall may define a cavity vent therethrough. The bottom heating element may be mounted above the bottom wall to heat a cooking surface within the oven chamber. The base panel may be disposed over the bottom heating element. The base panel may define an oven vent and a receiving zone spaced apart from the oven vent. The base panel may further define an enclosed region with the bottom wall about the bottom heating element. The enclosed region may be defined downstream from the cavity vent. The cooking plate may be disposed on the base panel within the receiving zone. The cooking plate may define the cooking surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Figure 1:
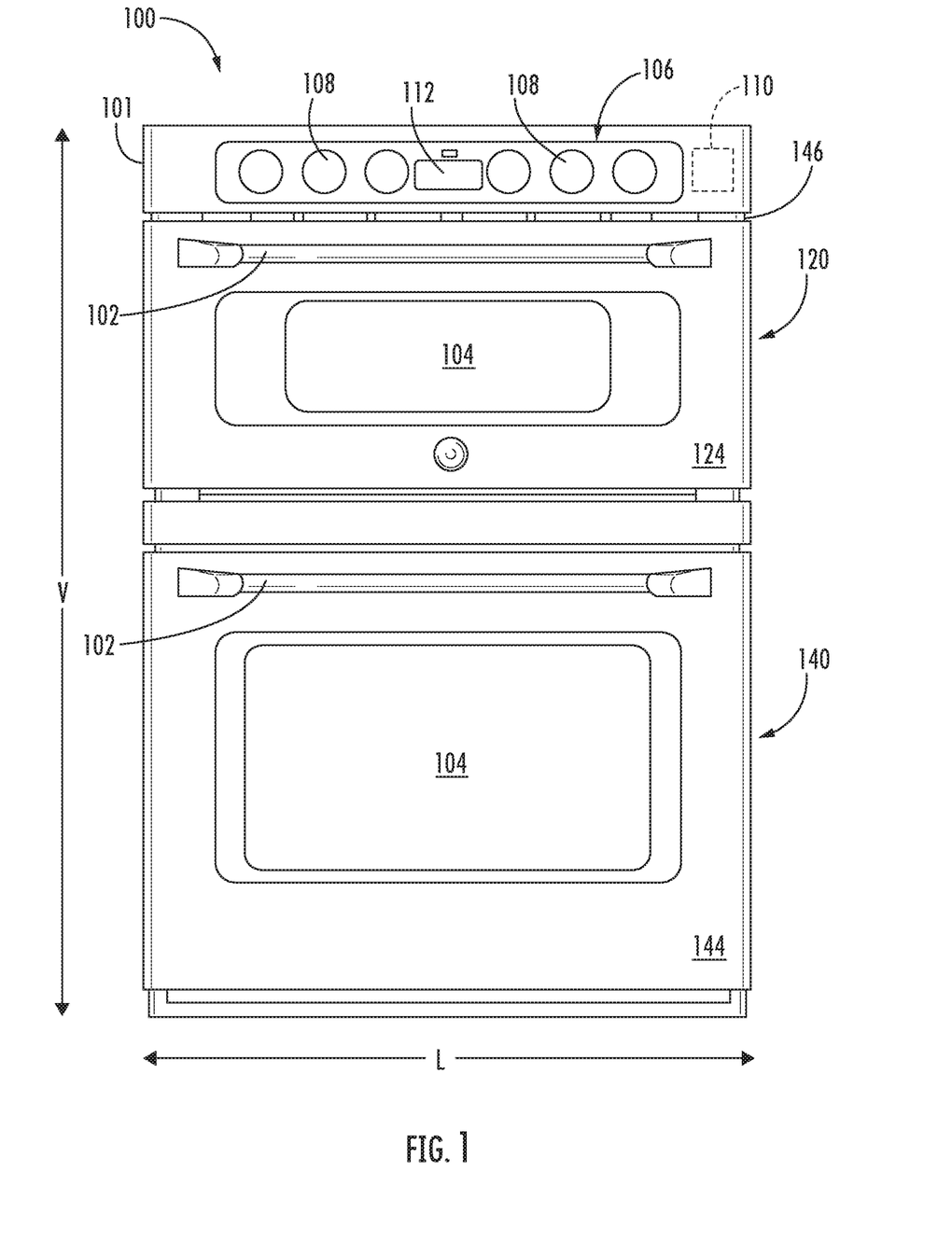
FIG. 1 provides an elevation view of an oven appliance according to exemplary embodiments of the present disclosure.

Referring now to the drawings, FIG. 1 illustrates an exemplary embodiment of a double appliance 10 according to the present disclosure.

Although aspects of the present subject matter are described herein in the context of a double oven appliance 100, it should be appreciated that oven appliance 100 is provided by way of example only. Other oven or range appliances having different configurations, different appearances, or different features may also be utilized with the present subject matter as well (e.g., single ovens, electric cooktop ovens, induction cooktops ovens, etc.).

Figure 2:
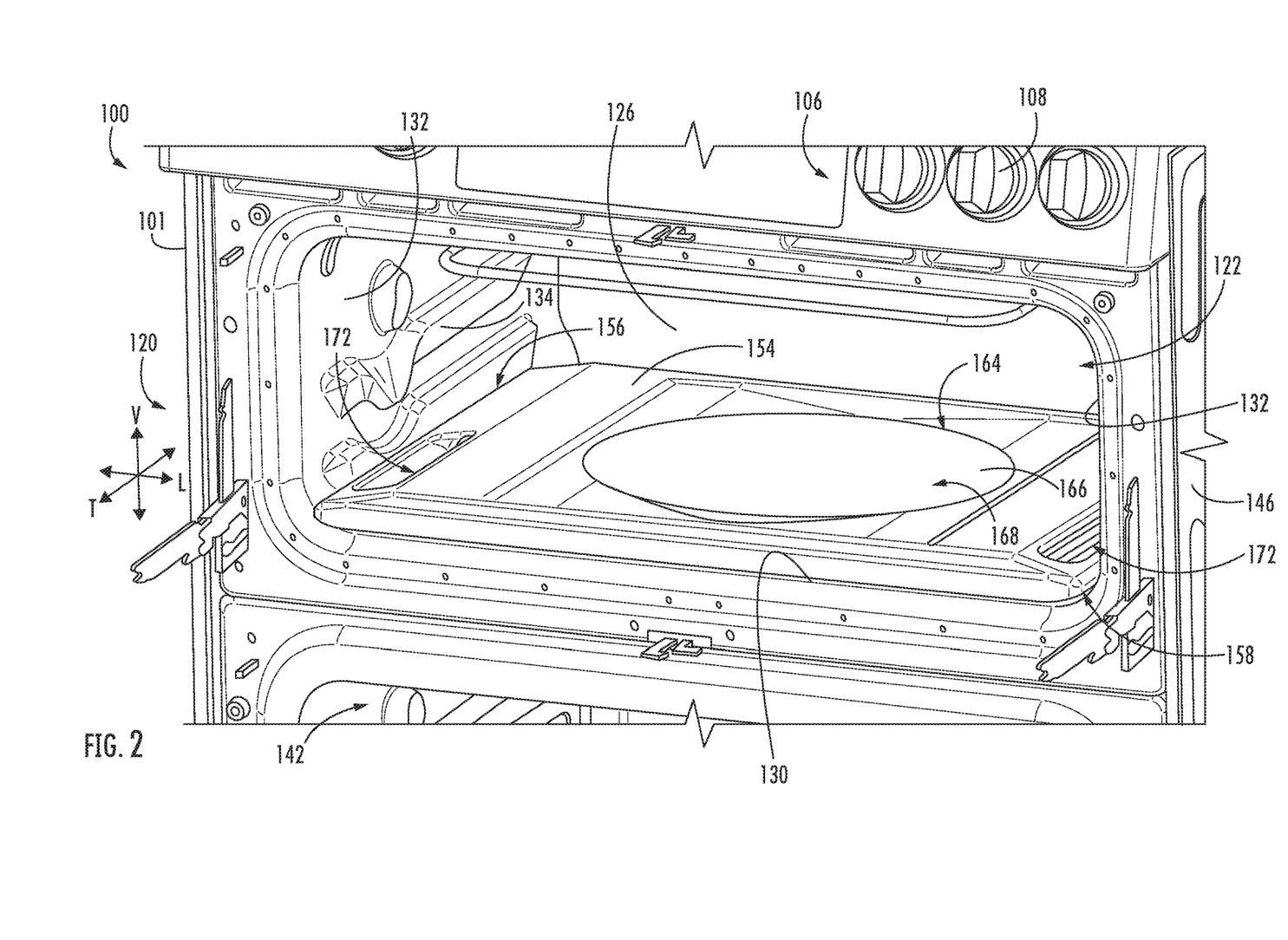
FIG. 2 provides a perspective view of an upper cooking chamber of the exemplary oven appliance of FIG. 1.
Figure 3:
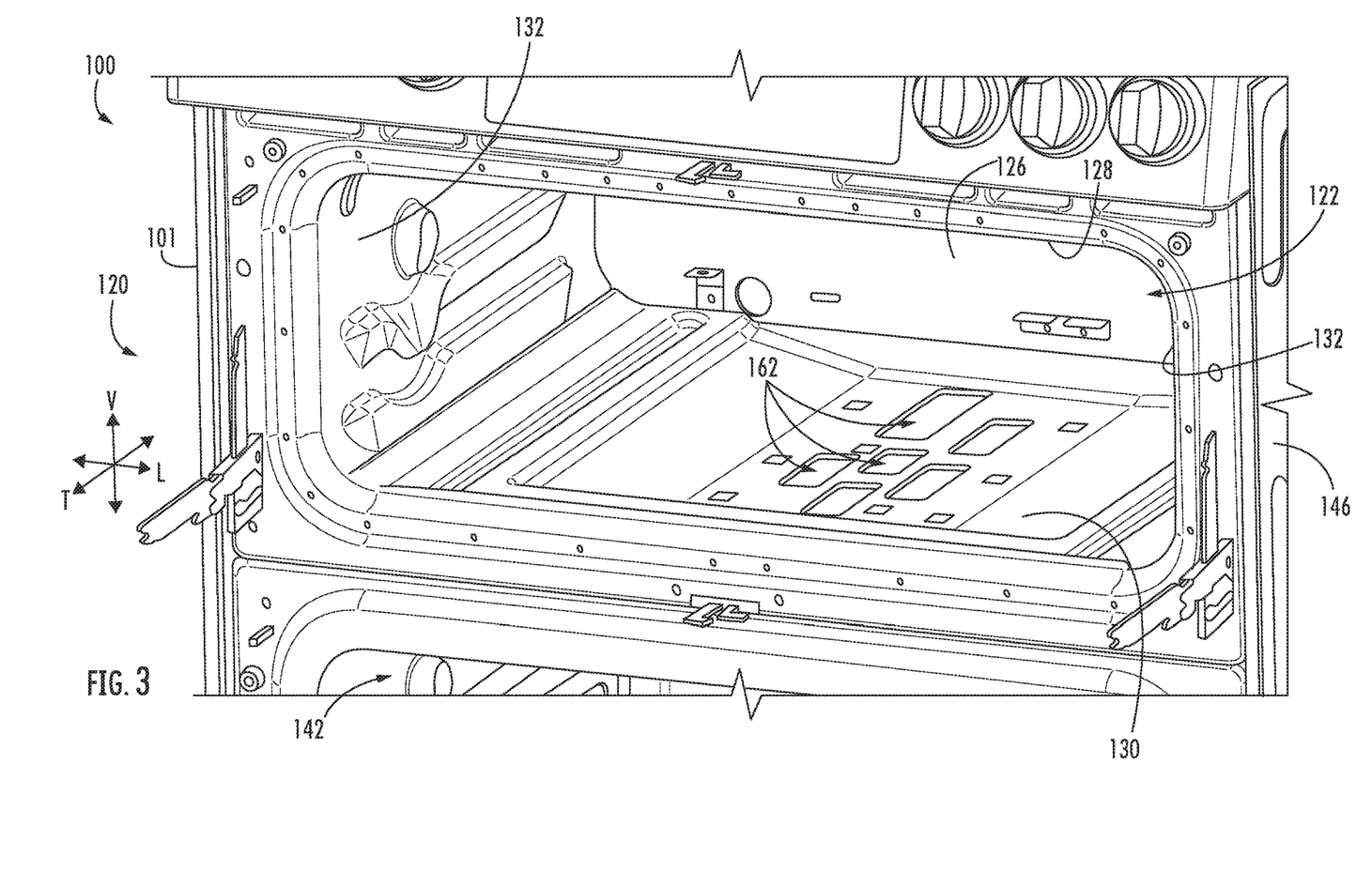
FIG. 3 provides a perspective view of the upper cooking chamber of the exemplary oven appliance of FIG. 1, wherein certain elements have been removed for clarity.
Figure 4:
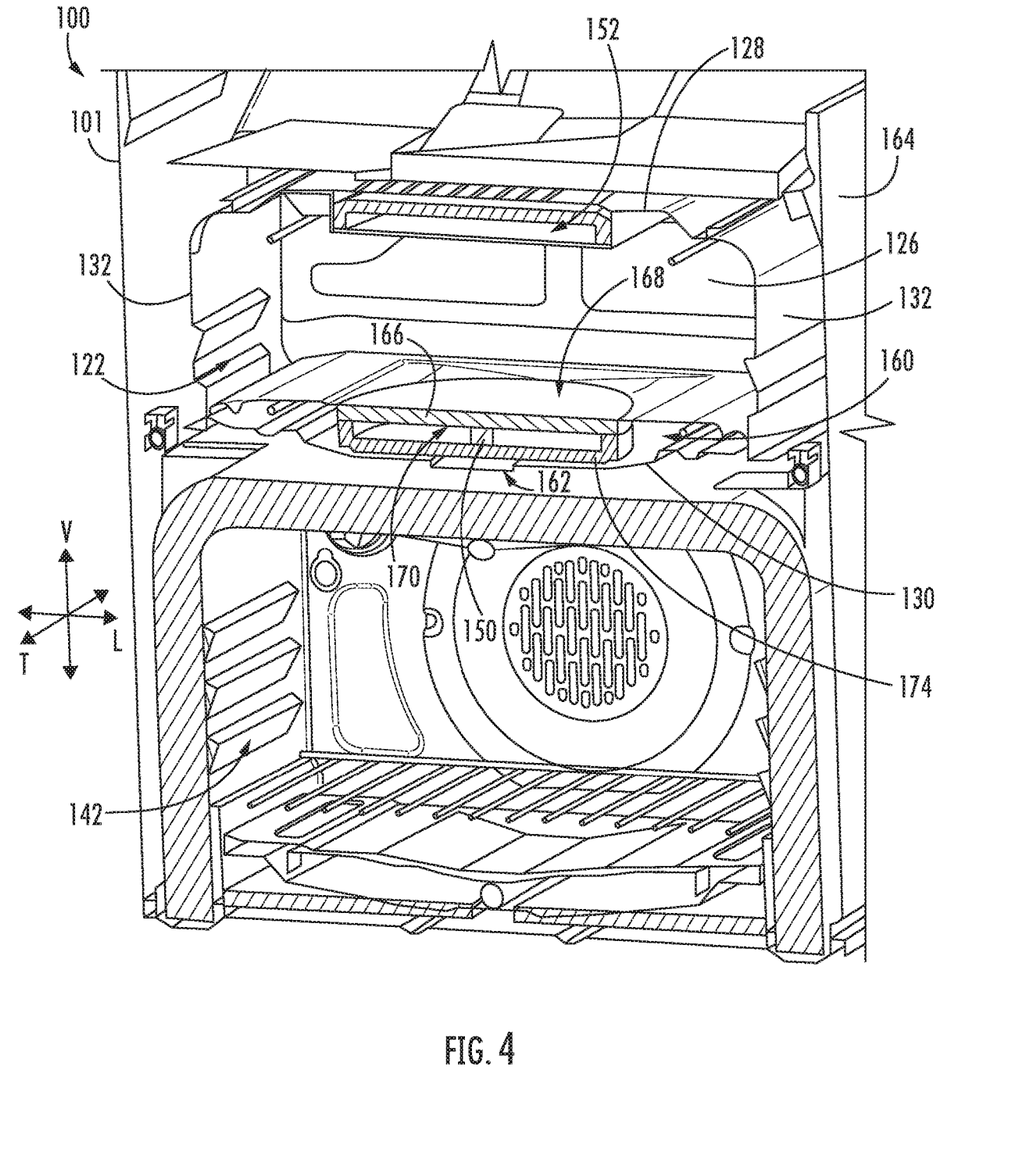
FIG. 4 provides a front, perspective, sectional view of a portion of the exemplary oven appliance of FIG. 1.

Generally, oven appliance 100 has a cabinet 101 defines a vertical direction V, a longitudinal direction L and a transverse direction T. The vertical, longitudinal and transverse directions are mutually perpendicular and form an orthogonal direction system. Double oven appliance 100 includes an upper oven 120 and a lower oven 140 positioned below upper oven 120 along the vertical direction V. Upper and lower ovens 120 and 140 include cooking chambers 122 and 142, respectively, configured for the receipt of one or more food items to be cooked. Double oven appliance 100 includes an upper door 124 and a lower door 144 in order to permit selective access to cooking chambers 122 and 142, respectively. Handles 102 are mounted to upper and lower doors 124 and 144 to assist a user with opening and closing doors 124 and 144 in order to access cooking chambers 122 and 142. As an example, a user can pull on handle 102 mounted to upper door 124 to open or close upper door 124 and access cooking chamber 122. Glass window panes 104 provide for viewing the contents of cooking chambers 122 and 142 when doors 124, 144 are closed and also assist with insulating cooking chambers 122 and 142. As illustrated further in FIGS. 2 and 3, heating elements, such as electric resistance heating elements, gas burners, microwave elements, etc., are positioned within upper and lower oven 120 and 140.

A control panel 106 of double oven appliance 100 provides selections for user manipulation of the operation of double oven appliance 100. For example, a user can touch control panel 106 to trigger one of user inputs 108. In response to user manipulation of user inputs 108, various components of the double oven appliance 100 can be operated. Control panel 106 may also include a display 112, such as a digital display, operable to display various parameters (e.g., temperature, time, cooking cycle, etc.) of the double oven appliance 100.

Figure 5:
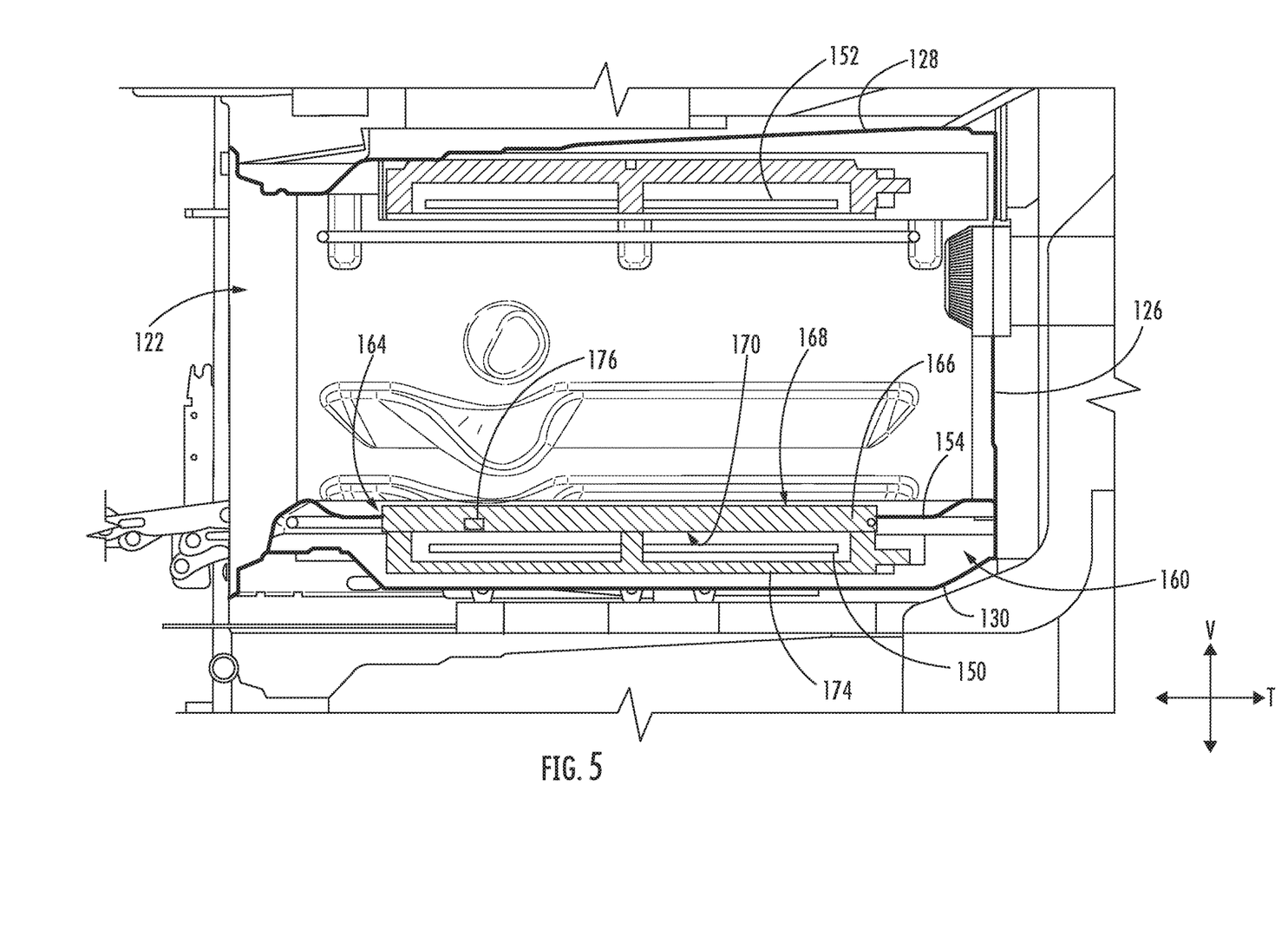
FIG. 5 provides a side sectional view of the upper cooking chamber of the exemplary oven appliance of FIG. 1.
Figure 6:
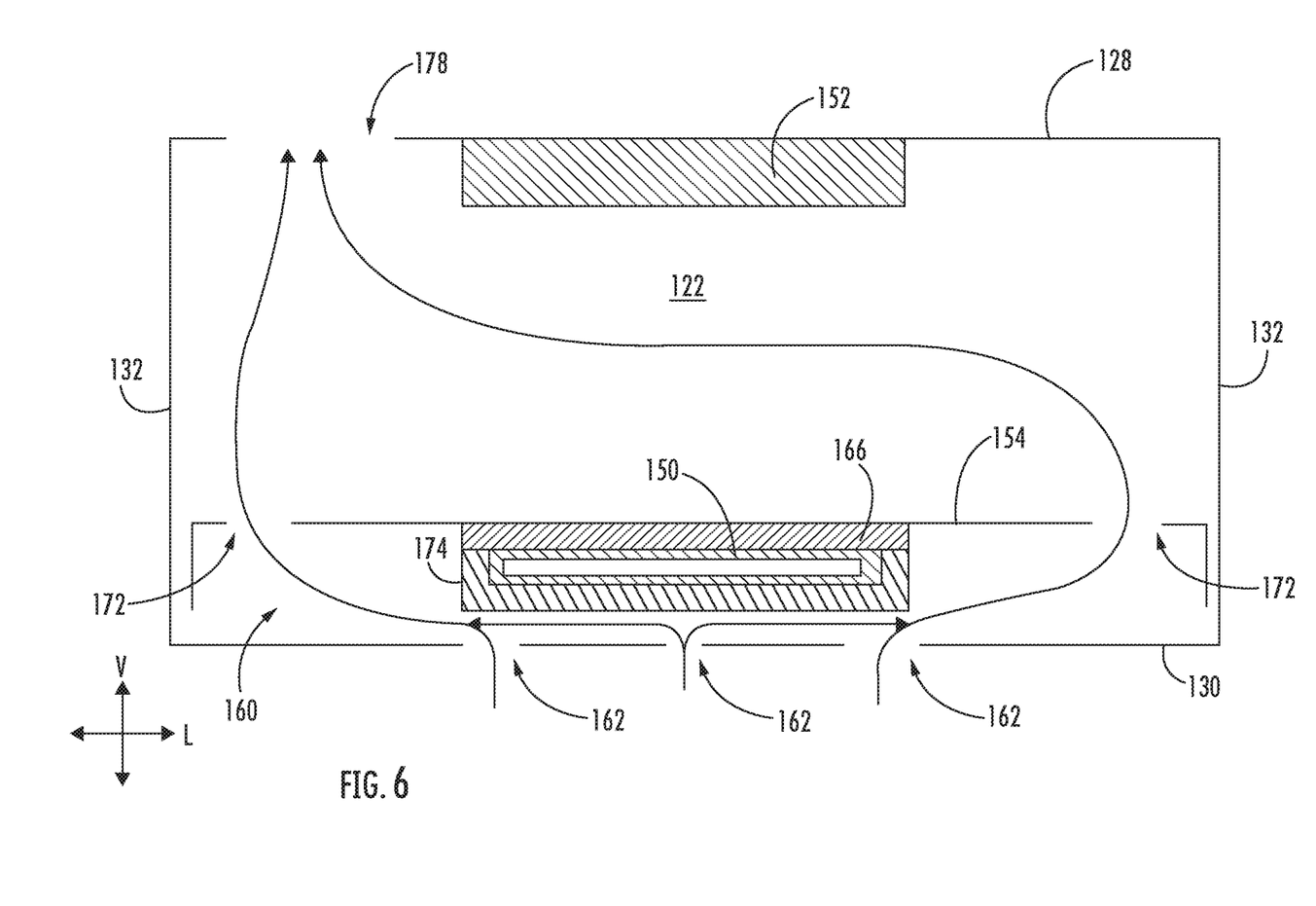
FIG. 6 provides a schematic elevation view of the upper cooking chamber of the exemplary oven appliance of FIG. 1.

Generally, oven appliance 100 may include a controller 110 in operative communication (e.g., operably coupled via a wired or wireless channel) with control panel 106. Control panel 106 of oven appliance 100 may be in communication with controller 110 via, for example, one or more signal lines or shared communication busses, and signals generated in controller 110 operate oven appliance 100 in response to user input via user input devices 108. Input/Output ("I/O") signals may be routed between controller 110 and various operational components of oven appliance 100 such that operation of oven appliance 100 can be regulated by controller 110. In addition, controller 110 may also be communication with one or more sensors, such as temperature sensor 176 (FIG. 5), which may be used to measure temperature inside upper cooking chamber 122 and provide such measurements to the controller 110. Although temperature sensor 176 is illustrated within an enclosed region 160 proximate to bottom heating element 150, it should be appreciated that other sensor types, positions, and configurations may be used according to alternative embodiments.

Controller 110 is a "processing device" or "controller" and may be embodied as described herein. Controller 110 may include a memory and one or more microprocessors, microcontrollers, application-specific integrated circuits (ASICS), CPUs or the like, such as general or special purpose microprocessors operable to execute programming instructions or micro-control code associated with operation of oven appliance 100, and controller 110 is not restricted necessarily to a single element. The memory may represent random access memory such as DRAM, or read only memory such as ROM, electrically erasable, programmable read only memory (EEPROM), or FLASH. In one embodiment, the processor executes programming instructions stored in memory. The memory may be a separate component from the processor or may be included onboard within the processor. Alternatively, controller 110 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Turning now to FIGS. 2 through 6, various views are provided illustrating, in particular, upper cooking chamber 122 of upper oven. As shown, upper cooking chamber 122 is generally defined by a back wall 126, a top wall 128 and a bottom wall 130 spaced from top wall 128 along the vertical direction V by opposing side walls 132 (e.g., a first wall and a second wall). In some embodiments opposing side walls 132 include embossed ribs 134 such that a baking rack (not shown) containing food items may be slidably received onto embossed ribs 134 and may be moved into and out of upper cooking chamber 122 when door 124 is open. Optionally, such walls 126, 128, 130, 132 may be included within an outer casing 146 of cabinet 101, as is understood.

As shown, upper oven includes one or more heating elements to heat upper cooking chamber 122 (e.g., as directed by controller 110 as part of a cooking operation). For instance, a bottom heating element 150 may be mounted at a bottom portion of upper cooking chamber 122 (e.g., above bottom wall 130). Additionally or alternatively, a top heating element 152 may be mounted at a top portion of upper cooking chamber 122 (e.g., below top wall 128). Bottom heating element 150 and top heating element 152 may be used independently or simultaneously to heat upper cooking chamber 122, perform a baking or broil operation, perform a cleaning cycle, etc.

The heating elements 150, 152 may be provided as any suitable heater for generating heat within upper cooking chamber 122. For instance, either heating element may include an electric heating element (e.g., resistance wire elements, radiant heating element, electric tubular heater or CALROD®, halogen heating element, etc.). Additionally or alternatively, either heating element may include a gas burner.

As shown, a base panel 154 may be provided within upper cooking chamber 122 (e.g., fixedly mounted or, alternatively, removably mounted). Within upper cooking chamber 122, base panel 154 is generally disposed over the bottom wall 130. In some embodiments, base panel 154 extends laterally between a first end 156 and a second end 158. As shown, the first end 156 may be attached to bottom wall 130 at one lateral side (e.g., proximal to first side wall 132) while second end 158 is attached to bottom wall 130 at the opposite lateral side (e.g., proximal to second side wall 132). Although base panel 154 may be mounted to bottom wall 130, at least a portion of base panel 154 is vertically spaced apart from bottom wall 130. In some embodiments, an enclosed region 160 is defined between base panel 154 and bottom wall 130. For instance, enclosed region 160 may be defined as an air gap between a lower surface 170 of base panel 154 and an upper surface of base panel 154. Base panel 154 may include or be formed from any suitable material (e.g., a first material) for enduring the high-heat environment of upper cooking chamber 122, such as steel.

In certain embodiments, bottom wall 130 defines one or more cavity vents 162. Such cavity vents 162 may be upstream from the enclosed region 160. For instance, cavity vents 162 may be defined below base panel 154 such that air is permitted to flow through bottom wall 130 (e.g., from a surrounding or ambient environment) to enclosed region 160. Optionally, cavity vents 162 may extend along the vertical direction V. Additionally or alternatively, one or more inlets defined by or through cabinet 101 or door upstream of cavity vent 162. During use, ambient air (e.g., outside of oven appliance 100) may be permitted through the inlets and to the enclosed region 160 through the cavity vents 162.

In some embodiments, base panel 154 defines a receiving zone 164 within which a cooking plate 166 is disposed (e.g., fixedly mounted or, alternatively, removably mounted). For instance, cooking plate 166 may be held or embedded within a hole or recess defining receiving zone 164. Optionally, one or more support tabs may be included within receiving zone 164 (e.g., beneath cooking plate 166) to hold cooking plate 166 to base panel 154. Generally, cooking plate 166 may provide an upper cooking surface 168 on which a food item (e.g., bread or pizza) may be received. Cooking plate 166 may be provided as a solid-nonpermeable member or, alternatively, define one or more apertures through which air may pass. In some embodiments, cooking plate 166 includes or is formed from a heat-retaining material, such as clay, stone (e.g., cordierite), ceramic, cast iron, or ceramic-coated carbon steel. In additional or alternative embodiments, cooking plate 166 includes a separate material (e.g., second material) from base panel 154.

Although shown as defining circular upper surface, it is understood that cooking plate 166 may be formed as any suitable shape on which food items may be supported.

Within the enclosed region 160 (e.g., below the receiving zone 164 or cooking plate 166), bottom heating element 150 may be enclosed or covered by base panel 154. Bottom heating element 150 may be disposed below the lower surface 170 of base panel 154. The enclosed region 160 may thus be defined about bottom heating element 150. During use, heat generated at bottom heating element 150 may be directed upward to a lower surface 170 of base panel 154 or cooking plate 166. In some embodiments, bottom heating element 150 is vertically aligned with (e.g., directly beneath) the receiving zone 164 or cooking plate 166. The heat generated at bottom heating element 150 may thus be guided primarily or initially to the underside of the receiving zone 164 or cooking plate 166.

Separate from receiving zone 164, base panel 154 may define one or more oven vents 172. Such oven vents 172 may extend through base panel 154 (e.g., from an upper surface to a lower surface 170). Specifically, oven vents 172 may extend to the enclosed region 160. When assembled, the oven vents 172 may be in fluid communication with (e.g., downstream from) the enclosed region 160. Air may thus pass between the enclosed region 160 and the oven vents 172. During certain operations, air may be routed out of the enclosed region 160 through the oven vents 172. For instance, air may be routed to the surrounding, upper portion of oven chamber or to an ambient environment outside of upper cooking chamber 122. The oven vents 172 may be directed away from the receiving zone 164 or cooking plate 166 (e.g., radially or laterally outward toward side walls 132 or back wall 126). Air from the oven vents 172 may thus be motivated (e.g., by natural or fan-forced convection) into the upper portion of upper cooking chamber 122 from the enclosed region 160 without directly flowing to the upper surface of cooking plate 166—and any food items thereon.

In optional embodiments, multiple oven vents 172 are defined by base panel 154 and spaced apart from each other (e.g., along the lateral direction L). Two or more oven vents 172 may be defined at opposite sides of cooking plate 166. For instance, a first oven vent 172 may be defined at a first lateral side of base panel 154 while a second oven vent 172 is defined at a second lateral side of base panel 154. The first oven vent 172 may be directed outward toward the first side wall 132. The second oven vent 172 may be directed outward toward the second side wall 132. During use, heated air within the enclosed region 160 may thus be evenly distributed through the upper cooking chamber 122 without flowing directly to the receiving zone 164 between the first and second oven vents 172.

In certain embodiments, an insulator plate 174 is provided below the bottom wall 130 along the vertical direction. Specifically, at least a portion of insulator plate 174 is disposed below bottom heating element 150. As an example, insulator plate 174 may be included with or as part of a support dish in which heating element 150 is housed and supported (e.g., within enclosed region 160). Insulator plate 174 may surround heating element 150, while defining a top opening to direct heat from heating element 150 upward (e.g., to receiving zone 164 or cooking plate 166). As an additional or alternative example, insulator plate 174 may include a stand-alone plate vertically aligned below heating element 150 such that heating element 150 is disposed between an upper surface of insulator plate 174 and a lower surface 170 of bottom wall 130. In optional embodiments, insulator plate 174 is disposed above one or more cavity vents 162. For instance, insulator plate 174 may be vertically aligned within cavity vents 162 and downstream therefrom.

Insulator plate 174 may be formed from or include any suitable low thermal conductivity material such as a metal or ceramic (e.g., ceramic fiber) insulation. During use, insulator plate 174 may generally block heat from being transmitted (e.g., downward) from heating element 150. Air (e.g., ambient air) may flow to and across insulator plate 174 from cavity vents 162 within enclosed region 160. Such air may provide further cooling for insulator plate 174. Moreover, at least a portion of the cooling air may flow from insulator plate 174, through enclosed region 160, and from one or more oven vents 172.

One or more temperature sensors 176 may be disposed within the enclosed region 160, for instance, to detect the temperature of heating element 150 or cooking plate 166. Optionally, the temperature sensor 176 may be mounted between the heating element 150 and the cooking plate 166. In some embodiments, a temperature sensor 176 is mounted to cooking plate 166. As an example, the temperature sensor 176 may be disposed on a bottom surface of cooking plate 166 (e.g., via a mechanical fastener, clip, or hook). As an additional or alternative example, the temperature sensor 176 may be held within a recess in cooking plate 166. As an additional or alternative example, the temperature sensor 176 may be embedded within cooking plate 166.

When assembled, the temperature sensor(s) 176 may be operably coupled to controller 110. Moreover, the controller 110 may be configured to control heating 150 element based on the temperature detected at a temperature sensor 176 (e.g., as part of a cooking operation). In some embodiments, a cooking operation initiated by the controller 110 may thus include detecting a temperature of the temperature sensor 176 within the enclosed region 160, and directing heat output from (e.g., a heat setting of) the bottom heating element 150 based on the detected temperature. For instance, a temperature setpoint for cooking plate 166 may be provided to or within the controller 110. While the heating element 150 is active, the controller 110 may detect the temperature at the temperature sensor 176 (e.g., repeatedly) to determine if the temperature setpoint is being met. If not, the controller 110 may increase or decrease the heat setting at the heating element 150 to establish and maintain the temperature at the cooking plate 166 at the temperature setpoint.

In optional embodiments, one or more exhaust openings 178 are defined through the chamber walls. Specifically, at least one chamber wall (e.g., top wall) may define an exhaust opening 178 downstream from the oven vent 172. The exhaust opening 178 may extend to or communicate with the ambient environment about oven appliance 100. Thus, air, gas, or fumes within the upper cooking chamber 122, including at least a portion of air from the enclosed region 160, may exit upper cooking chamber 122. As is understood, the air through exhaust opening 178 may be motivated by natural convection or forced convection from an included oven fan (not pictured).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical, a lateral, and a transverse direction, the oven appliance comprising:
    a plurality of chamber walls defining an oven chamber, the plurality of chamber walls comprising a back wall, a top wall, a first side wall, a second side wall, and a bottom wall defining a cavity vent;
    a bottom heating element mounted above the bottom wall to heat a cooking surface within the oven chamber;
    an insulator plate disposed above the cavity vent between the bottom heating element and the bottom wall along the vertical direction, the insulator plate surrounding the bottom heating element and being spaced apart from the cavity vent along the vertical direction to define a vertical gap between the insulator plate and the cavity vent;
    a base panel disposed over the bottom heating element, the base panel defining an oven vent and a receiving zone spaced apart from the oven vent, the base panel further defining an enclosed region with the bottom wall about the bottom heating element; and
    a cooking plate disposed on the base panel within the receiving zone, the cooking plate defining the cooking surface,
    wherein the insulator plate is disposed downstream from the cavity vent to receive a cooling airflow from the cavity vent within the enclosed region, and
    wherein the oven vent is disposed downstream from the enclosed region to receive at least a portion of the cooling airflow from the enclosed region.

2. The oven appliance of claim 1, wherein the oven vent is directed away from the receiving zone to route air out of the enclosed region.

3. The oven appliance of claim 1, wherein the oven vent is a first oven vent defined at a first lateral side of the base panel, and wherein the base panel defines a second oven vent at a second lateral side, the first and second oven vents being spaced apart from each other at opposite sides of the cooking plate.

4. The oven appliance of claim 1, further comprising a temperature sensor disposed within the enclosed region.

5. The oven appliance of claim 4, wherein the temperature sensor is mounted to the cooking plate.

6. The oven appliance of claim 4, wherein the temperature sensor is mounted between the bottom heating element and the cooking plate.

7. The oven appliance of claim 4, further comprising a controller operably coupled to the temperature sensor and the bottom heating element, the controller being configured to initiate a cooking operation comprising
    detecting a temperature of the temperature sensor within the enclosed region, and directing heat output from the bottom heating element based on the detected temperature.

8. The oven appliance of claim 1, wherein the bottom heating element comprises an electric heating element.

9. The oven appliance of claim 1, wherein the bottom heating element comprises a gas burner.

10. The oven appliance of claim 1, wherein one chamber wall of the plurality of chamber walls defines an exhaust opening above the bottom wall downstream from the oven vent and the oven chamber.

11. An oven appliance defining a vertical, a lateral, and a transverse direction, the oven appliance comprising:
    a plurality of chamber walls defining an oven chamber, the plurality of chamber walls comprising a back wall, a top wall, a first side wall, a second side wall, and a bottom wall, the bottom wall defining a cavity vent upstream from the oven chamber;
    a bottom heating element mounted above the bottom wall to heat a cooking surface within the oven chamber;
    an insulator plate disposed above the cavity vent between the bottom heating element and the cavity vent along the vertical direction, the insulator plate surrounding the bottom heating element and being spaced apart from the cavity vent along the vertical direction to define a vertical gap between the insulator plate and the cavity vent;
    a base panel disposed within the oven chamber and defining an enclosed region with the bottom wall downstream from the cavity vent, the base panel defining an oven vent and a receiving zone, the receiving zone being positioned above the bottom heating element, and the oven vent being directed away from the receiving zone to route air out of the enclosed region; and
    a cooking plate disposed on the base panel within the receiving zone, the cooking plate defining the cooking surface,
    wherein the insulator plate is disposed downstream from the cavity vent to receive a cooling airflow from the cavity vent within the enclosed region, and
    wherein the oven vent is disposed downstream from the enclosed region to receive at least a portion of the cooling airflow from the enclosed region.

12. The oven appliance of claim 11, wherein the oven vent is a first oven vent defined at a first lateral side of the base panel, and wherein the base panel defines a second oven vent at a second lateral side, the first and second oven vents being spaced apart from each other at opposite sides of the cooking plate.

13. The oven appliance of claim 11, further comprising a temperature sensor disposed within the enclosed region.

14. The oven appliance of claim 13, wherein the temperature sensor is mounted to the cooking plate.

15. The oven appliance of claim 13, wherein the temperature sensor is mounted between the bottom heating element and the cooking plate.

16. The oven appliance of claim 13, further comprising a controller operably coupled to the temperature sensor and the bottom heating element, the controller being configured to initiate a cooking operation comprising
    detecting a temperature of the temperature sensor within the enclosed region, and
    directing heat output from the bottom heating element based on the detected temperature.

17. The oven appliance of claim 11, wherein the bottom heating element comprises an electric heating element or a gas burner.

18. The oven appliance of claim 11, wherein one chamber wall of the plurality of chamber walls defines an exhaust opening above the bottom wall downstream from the oven vent and the oven chamber.

19. An oven appliance defining a vertical, a lateral, and a transverse direction, the oven appliance comprising:
    a plurality of chamber walls defining an oven chamber, the plurality of chamber walls comprising a back wall, a top wall, a first side wall, a second side wall, and a bottom wall, the bottom wall defining a cavity vent therethrough;
    a bottom heating element mounted above the bottom wall to heat a cooking surface within the oven chamber;
    an insulator plate vertically aligned with the cavity vent and disposed between the bottom heating element and the cavity vent along the vertical direction, the insulator plate surrounding the bottom heating element and being spaced apart from the cavity vent along the vertical direction to define a vertical gap between the insulator plate and the cavity vent;
    a base panel disposed over the bottom heating element, the base panel defining an oven vent and a receiving zone spaced apart from the oven vent, the base panel further defining an enclosed region with the bottom wall about the bottom heating element, the enclosed region being defined downstream from the cavity vent; and
    a cooking plate disposed on the base panel within the receiving zone, the cooking plate defining the cooking surface,
    wherein the insulator plate is disposed downstream from the cavity vent to receive a cooling airflow from the cavity vent within the enclosed region, and
    wherein the oven vent is disposed downstream from the enclosed region to receive at least a portion of the cooling airflow from the enclosed region.

20. The oven appliance of claim 19, further comprising a temperature sensor disposed within the enclosed region.

* * * * *